US012617075B2

(12) United States Patent
Albu-Schäffer et al.

(10) Patent No.: US 12,617,075 B2
(45) Date of Patent: May 5, 2026

(54) NONLINEAR DYNAMIC SYSTEM AND METHOD FOR DESIGNING A NONLINEAR DYNAMIC SYSTEM

(71) Applicants: Deutsches Zentrum für Luft-und Raumfahrt e.V., Bonn (DE); Technische Universität München, Munich (DE)

(72) Inventors: Alin Albu-Schäffer, Bonn (DE); Arne Sachtler, Munich (DE)

(73) Assignees: Deutsches Zentrum für Luft- und Raumfahrt e.V., Bonn (DE); Technische Universität München, Munich (DE)

( * ) Notice: Subject to any disclaimer, the term of this patent is extended or adjusted under 35 U.S.C. 154(b) by 208 days.

(21) Appl. No.: 18/276,723

(22) PCT Filed: Feb. 7, 2022

(86) PCT No.: PCT/EP2022/052884
§ 371 (c)(1),
(2) Date: Aug. 10, 2023

(87) PCT Pub. No.: WO2022/171573
PCT Pub. Date: Aug. 18, 2022

(65) Prior Publication Data
US 2024/0316757 A1 Sep. 26, 2024

(30) Foreign Application Priority Data
Feb. 12, 2021 (DE) ..................... 10 2021 103 397.7

(51) Int. Cl.
B25J 9/02 (2006.01)
B25J 9/16 (2006.01)

(52) U.S. Cl.
CPC ............... B25J 9/02 (2013.01); B25J 9/1664 (2013.01)

(58) Field of Classification Search
CPC ................................... B25J 9/02; B25J 9/1664
See application file for complete search history.

(56) References Cited

U.S. PATENT DOCUMENTS

2021/0138642 A1 * 5/2021 Verdi ..................... B25J 9/1641
2023/0052996 A1 * 2/2023 Thomsen ............... B25J 9/1602

FOREIGN PATENT DOCUMENTS

DE 102016200394 A1 * 7/2017 ................ B25J 9/10
JP 2013004037 A * 1/2013 ............ B25J 9/1635
KR 20120048106 A * 5/2012 ............ B25J 9/1664

OTHER PUBLICATIONS

Albu-Schäffer et al., "One-dimensional solution families of nonlinear systems characterized by scalar functions on Riemannian manifolds", arxiv.org, 2019, https://arxiv.org/abs/1911.01882.

(Continued)

*Primary Examiner* — Dale Moyer
(74) *Attorney, Agent, or Firm* — The Webb Law Firm

(57) ABSTRACT

The invention relates to a dynamic nonlinear system having a plurality of degrees of freedom. The system has at least one potential element, and eigenmodes of the system are produced by means of the potential element. A potential is produced by means of the at least one potential element, and the potential causes an acceleration tangential to the basic trajectories of the system, a basic trajectory being a trajectory of the potential-free system.

18 Claims, 6 Drawing Sheets

(56) References Cited

OTHER PUBLICATIONS

Albu-Schäffer et al., "A review on nonlinear modes in conservative mechanical systems", Annual Reviews in Control, 2020, vol. 50, pp. 49-71.
Albu-Schäffer et al., "Strict Nonlinear Normal Modes of Systems Characterized by Scalar Functions on Riemannian Manifolds", IEEE Robotics and Automation Letters, Apr. 2021, vol. 6, No. 2, pp. 1910-1917.
Calzolari et al., "PD-Like Regulation of Mechanical Systems With Prescribed Bounds of Exponential Stability: The Point-to-Point Case", IEEE Control Systems Letters, Dec. 2021, vol. 5, No. 6, pp. 2102-2107.

* cited by examiner

Value of the labeling function

NONLINEAR DYNAMIC SYSTEM AND METHOD FOR DESIGNING A NONLINEAR DYNAMIC SYSTEM

CROSS-REFERENCE TO RELATED APPLICATIONS

This application is the United States national phase of International Application No. PCT/EP2022/052884 filed Feb. 7, 2022, and claims priority to German Patent Application No. 10 2021 103 397.7 filed Feb. 12, 2021, the disclosures of which are hereby incorporated by reference in their entireties.

BACKGROUND OF THE INVENTION

Field of the Invention

The present invention relates to a nonlinear dynamic system with multiple degrees of freedom. The present invention further relates to a method for designing a nonlinear dynamic system with multiple degrees of freedom.

Description of Related Art

Coupled, potentially nonlinear dynamic systems are used in many technical fields. In particular in robot technology, the mechanics can be described as such a system. Additional energy storages and dissipative elements in the system improve the robustness against destruction and the interaction with other systems. Moreover, these elements can improve the energy efficiency in systems. Without the use of energy storages, forces required for movement have to be provided by actuators alone. When actuators are used, energy losses occur. Potential energy storages can contribute or even completely take over forces necessary for acceleration, so that the power requirements to the actuators are reduced.

Adding energy storages to dynamic systems may result in oscillatory systems. With oscillatory linear dynamic systems or systems that are locally approximated with linear differential equations, at least n oscillation modes exist for a system with n degrees of freedom. Along a mode, the linear system can be described with only one generalized system variable (coordinate) and its time derivative.

Each of these solutions describes a system behavior along a modal line, in which there is a permanent exchange between potential energy and kinetic energy. The modal line is an invariant line of movement, independent of the magnitude of the oscillation energy of the system—the overall energy only affects the amplitude of the oscillation along this line. In general, the oscillation modes are isolated in the configuration space. It is known that there is a generalization of such modal oscillations also for nonlinear systems (Albu-Schäffer, A.; Lakatos, D., Stramigioli, S., "Strict Nonlinear Normal Modes of Systems Characterized by Scalar Functions on Riemannian Manifolds", IEEE Robotics and Automation Letters, 2021 and Albu-Schäffer, A. & Della Santina, C., "A review on nonlinear modes in conservative mechanical systems" Annual Reviews in Control, 2020, 50, 49-71). This time, the oscillation no longer occurs along a straight line in the configuration space, but in general along a bent curve. If, also in this case, the curve is invariant with respect to the oscillation case, this mode is referred to as a strict nonlinear mode.

The existence and the characteristics of the strict nonlinear modes depend on the system dynamics. Like a linear system, a nonlinear system of n-th order comprises at least n oscillation modes under certain conditions—this, however, includes energy-dependent modes—strict nonlinear modes are generally much rarer (ibid). For each energy level, the modes are mostly isolated in the configuration space, so that only a small part of the configuration space is reached by modes. Oscillations without exchange of energy with the outside world are possible on the isolated oscillation modes. If other points in the configuration space are to be reached, controllers and strong actuators are required, which impress the desired dynamics. Here, it may even be necessary to fill and empty the energy storages present in the system. The impression of the desired dynamics is therefore most often associated with energy losses and a reduction of the maximum available peak power.

SUMMARY OF THE INVENTION

It is an object of the present invention to provide a nonlinear dynamic system which is versatile and energy-efficient.

The object is achieved with a nonlinear dynamic system, a method and a nonlinear dynamic system as described herein.

The nonlinear dynamic system according to the invention has multiple degrees of freedom. The nonlinear dynamic system may be a mechanical system, such as a robot arm, which, by its kinematics, provides multiple degrees of freedom in movement. As an alternative thereto, the dynamic system is an electronic system, the multiple degrees of freedom being implemented by interconnected electronic components. The system has at least two or more degrees of freedom. The system according to the invention comprises at least one potential element. By using a potential element, an oscillatory system is already provided. Here, the system oscillates along the eigenmodes if the system was initialized on one of the isolated eigenmodes. In mechanical systems, the oscillation is the actual trajectory of the system or the movement of the system expressed, for example, in generalized coordinates. If the system is an electrical system, the oscillation refers to the electric variables. According to the describing differential equations, a correspondence of charge and position, current and velocity, voltage and force etc. can be established.

Since, according to the invention, the movement of the system occurs along the eigenmodes, a particularly energy-efficient movement of the system is ensured. In the case of a periodic movement along the eigenmode, deceleration and acceleration at the end of the modal curve, for example, are performed by the potential element which stores the kinetic energy and releases it again. Thus, for a periodic movement, only possible friction losses have to be compensated by an actuator.

According to the invention, a potential is generated by the at least one potential element, the potential causing an acceleration to act tangential to the basic trajectories of the system and in particular to all basic trajectories of the system starting from one point. A basic trajectory refers to a trajectory of the potential-free system, i.e. in the mechanical case, a trajectory of the pure multi-body system without elastic elements. The basic trajectories are also referred to as geodesics of the multi-body system. In this respect, it has been found that when such a potential is applied, which always accelerates the system tangentially to the basic trajectories, a plurality of points within the configuration space lie on eigenmodes of the system. In particular, it is possible that the set of modes densely covers a portion of the configuration space, starting from one point. Thus, it is possible in a particularly simple manner to use suitable eigenmodes of the system for different movements. Since, in this case, the movement of the system follows the eigenmodes, this movement can be made in particularly energy-efficient manner. In this context, the movement along the eigenmodes of the system is not dependent on the movement speed, so that also fast movements can occur along the eigenmodes. Thus, the present invention makes use of the finding that, if a suitable potential is provided, the eigenmodes of the system lie densely in the configuration space and in particular each point of the configuration space lies on such an eigenmode. A system with such a potential allows many and in particular all points in the configuration space to be reached with a periodic oscillation and thus in a particularly energy-efficient manner. In prior art, only certain points can be reached in this manner, since the eigenmodes are isolated in known systems and a complex adaptation to the respective applications or the desired movements is necessary.

If the system is allowed to start without speed (or with an initial speed along the mode) at an optional point, it is automatically on an oscillation mode and keeps returning periodically to the starting point without energy being supplied. This is under the assumption that no frictional losses occur. Otherwise, the lost part of the energy has to be supplied again. In prior art, this is applies only to starting points which lie on one of the isolated oscillation modes. Trajectories of other starting points may result in chaotic, periodic or aperiodic courses. If, in such a case, the system converges to a periodic solution, the starting point is generally no part of the periodic solution.

Preferably, the potential element is a mechanical or electrical energy storage. In particular, the at least one potential element is a spring connected directly or by kinematic couplings, capacitance, pneumatic or hydraulic elements or the like. This generally provides an oscillatory system.

The at least one potential element is preferably an electric motor which is operated in particular via regenerative converters, and in which the potential force is commanded to the motor as a set force via a software. Here, the regeneration can be made, for example, into capacitors, batteries or simply the mains. In particular, the electric motor is a direct drive.

Preferably, a plurality of potential elements is provided, wherein all potential elements may be of the same type or different potential elements can be combined with each other. As such, the desired potential can be generated, for example, by a combination of one or a plurality of springs and one or a plurality of electric motors. Other combinations are also possible.

The potential elements are preferably nonlinear potential elements. Thereby, sufficient degrees of freedom with respect to the design of the potential are provided to generate a potential by means of the nonlinear potential elements, which potential generates an acceleration tangential to the basic trajectories of the system.

Preferably, a plurality of potential elements is provided. Thus, a desired potential can be provided in a suitable manner, and in particular sufficient degrees of freedom are provided for designing the potential by means of the potential elements, so that the potential causes an acceleration of the system tangential to the basic trajectories of the system at every point in the configuration space considered.

Preferably, every point of the configuration space or of a subregion of the configuration space of the system lies on one of the eigenmodes. Thus, every configuration of the system can be achieved by a movement along an eigenmode, whereby a particularly energy-efficient movement, in particular in the case of periodic movements, is ensured which can be adapted to the respective application in a particularly simple manner.

Preferably, the potential has an energy minimum. This energy minimum represents a rest position for the system and can be seen as a starting point of the movement. Upon a deflection of the system from the energy minimum of the potential, a movement along the eigenmodes occurs and thus, given a suitable direction of the initial speed, it is possible to reach any point in the configuration space or any configuration of the system along the corresponding eigenmode.

Preferably, the eigenmode followed by the movement is selected based on the direction of the initial speed or the starting speed. In particular, the eigenmode is selected exclusively based on the direction of the initial speed. Here, the eigenmode is independent of the magnitude of speed, so that thereby a faster or slower movement still follows the respective eigenmode.

Preferably, the eigenmodes of the system correspond to just the basic trajectories.

Preferably, the eigenmodes are geodesics or basic trajectories of a suitable metric, the suitable metric being in particular the metric of the mass (inertia) tensor/mass (inertia) matrix of the system.

Preferably, the potential U fulfills the condition $$\frac{\partial U}{\partial q} M(\gamma)^{-1} \dot{\gamma}^{\perp} = 0,$$

where $q \in Q$ is the configuration coordinate of the system, $M(q)$ is the inertia tensor, $\gamma$: [0, T]$\rightarrow$Q is a basic trajectory, for example parameterized by the path length, and where $\dot{\gamma}^{\perp}$ denotes a vector perpendicular to the time derivative of $\gamma$. It is ensured thereby that the potential $U(q)$ generates no accelerations having components outside the tangent space of the basic trajectories. This is the case, if the acceleration of the system generated by the potential is tangential to the basic trajectory. Here, the inertia tensor M depends on the kinematics and the mass distribution of the mechanical system.

Preferably, the potential U is determined by minimizing a cost function. The cost function is given, for example, by $$L(\omega) = \sum_{i=1}^{N} \sum_{j=1}^{M} \left[ \frac{\partial U_{\omega}}{\partial q} (\gamma_{ij}) M(\gamma_{ij})^{-1} \dot{\gamma}_{ij}^{\perp} \right]^{2},$$

where N is the number of integrated basic trajectories or geodesics of the potential, which are respectively discretized by M points per geodesic. Geodesics or basic trajectories $\gamma$ of the system describe movement trajectories of the potential-free system. $\gamma_{ij}$ denotes the j-th point of the j-th geodesic for $i \in 1 \ldots N$ and $j \in 1 \ldots M$, and $\dot{\gamma}_{ij}$ denotes the tangent at the same point. The objective function $U(q)$ is parameterized by the parameter $\omega$ to $U_{\omega}(q)$. Thereafter, the cost function is minimized.

$$\hat{\omega} = \arg\min_{\omega} L(\omega),$$

so that an optimum of the potential $U_{\omega}(q)$ is obtained which is then realized by means of the potential elements.

The system preferably comprises a controller, the controller generating a restoring value $\tau_\theta$, where the restoring value $\tau_\theta$ is, in particular, a restoring force. Here, the restoring value $\tau_\theta$ depends on the deviation $\Delta\theta$ of the movement $q(\theta)$ from the eigenmode $\theta$ of the movement. Thus, if the actual movement of the system deviates from the eigenmode $\theta$ that corresponds to the desired movement, the system is controlled by a restoring value $\tau_\theta$, so that the movement $q(\theta)$ follows the eigenmode. It is thereby ensured that deviations of the potential from an optimum, inaccuracies in the kinematics, the design of the system or external disturbances are compensated for in a suitable manner, so that the system can continue to follow the desired eigenmode. However, since this is only a compensation for an inaccuracy, the restoring value to be applied is small and the system can thus still be operated in a energy-efficient manner.

Preferably, the restoring value of the controller is given by $$\tau_\theta = M(q)\frac{\partial U^\perp}{\partial q}\left[-k_{\theta P}\Delta\theta(q) - d_\theta(q)\dot{\theta}\right],$$

where $\Delta\theta$ is the deviation from the desired mode $\theta$, $\dot{\theta}$ is the rate of change of the deviation of the desired mode, and $\partial U^\perp/\partial q$ is a unit vector orthogonal to $\partial U/\partial q$. Further, $k_{\theta P}$ denotes a constant and $d_\theta(q)$ determines the damping of the system. Thus, a connection between the restoring value $\tau_\theta$ of the controller and the deviation $\Delta\theta$ of the movement from the selected eigenmode can be determined directly.

Preferably, the controller is inactive or the restoring force $\tau_\theta$ is zero, as long as the distance of the configuration variable to the starting point/energy minimum of the potential is smaller than a preset limit value $\alpha$.

Preferably, the controller acts continuously on the movement of the system. As an alternative or in addition, the controller acts on the movement of the system at the reversal point of the movement. As an alternative or in addition, the controller acts on the movement of the system when the movement passes through the energy minimum of the potential. It is ensured thereby that only small actuator forces have to be applied to the system. The energy additionally introduced into the system can be minimized in thereby.

Preferably, the system is a system which can be described by the equation $$M(q)\ddot{q} + C(q, \dot{q})\dot{q} = 0$$

if the potential is not taken into consideration. Including the potential function, the system preferably is a system which can be described by the equation $$M(q)\ddot{q} + C(q, \dot{q})\dot{q} + \frac{\partial U}{\partial q} = 0.$$

The present invention further relates to a method for designing a system, the system being a nonlinear, dynamic mechanical, electrical or electromechanical system with multiple degrees of freedom. The method comprises the following steps:

a) selecting a starting point of the system;

b) determining a potential of the system, the potential generating an acceleration tangential to the basic trajectories of the system, in particular to all basic trajectories of the system, a basic trajectory representing a trajectory of the potential-free system, and c) implementing the potential by means of potential elements.

In this manner, a system is provided whose eigenmodes cover each point within the configuration space. Thus, it is ensured that any configuration of the system can be reached by a movement along an eigenmode, starting from the starting point of the system, whereby the movement is particularly energy-efficient. At the same time, due to the choice of the potential, the starting point represents a rest position of the system.

Preferably, the basic trajectories of the system are determined first, prior to step b), by determining the possible trajectories of the movement of the potential-free system. The basic trajectories are given by the dynamics of the potential-free system, which is described in particular by the mass inertia tensor, provided the system is a mechanical system. For other systems, the same applies. Here, the basic trajectories are geodesics of the Riemannian manifold with the mass inertia tensor as metric.

Preferably, the basic trajectories of the system are adapted to a given movement by adapting the kinematics and/or components of the system, such as e.g. an adaptation of the kinematics, the masses of the segments, their coupling, dimensions or the like. If the system is an electronic system, an adaptation to the dynamics of the system is made by adapting the electrical components, such as e.g. the capacitance of the capacitors, inductances or the adaptation of the resistors or the like.

In particular, the method is embodied based on the features described above with respect to the system.

The present invention further relates to a dynamic system with multiple degrees of freedom, the system being designed according to the above described method.

BRIEF DESCRIPTION OF THE DRAWINGS

In the following, the invention is described in more detail by means of preferred embodiments with reference to the accompanying drawings.

In the Figures.

DESCRIPTION OF THE INVENTION

Figure 1:
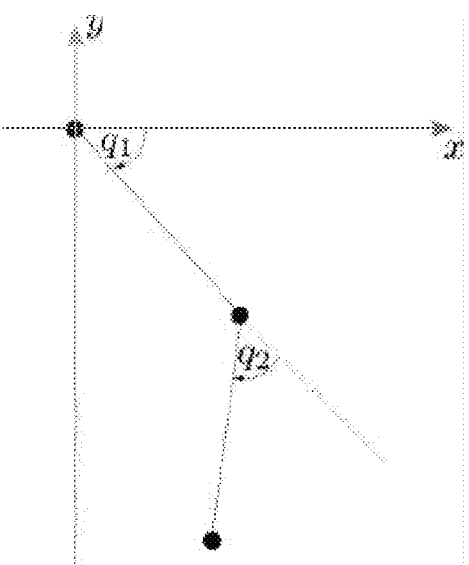
FIG. 1 shows a selected example of a dynamic system according to the present invention.

The embodiment will be analyzed based on a double pendulum according to FIG. 1 outside of a gravitational field (e.g. in a horizontal plane). The method illustrated can be extended to an environment with gravities by compensating the gravitational field in the selected potential field.

The double pendulum in FIG. 1 has two degrees of freedom which are described by means of the configuration coordinates or variables $q_1$ and $q_2$. The present invention is neither limited to the present example, nor to the number of dimensions, so that complex, high-dimensional systems can also be implemented in a comparable manner.

The dynamics of the double pendulum without external forces and without potential is described by the differential equation $$M(q)\ddot{q} + C(q, \dot{q})\dot{q} = 0 \qquad (1)$$

Here, $\dot{q}$ describes the function of the configuration variable derived according to time, the matrix $M(q)$ describes the mass inertia tensor and $C(q, \dot{q})\dot{q}$ describes Coriolis and centrifugal forces.

The goal is to find a potential function $U(q)$, so that the system dynamics $$M(q)\ddot{q} + C(q, \dot{q})\dot{q} + \frac{\partial U}{\partial q} = 0 \qquad (2)$$

for optional starting points $q(0)=q_0$ with $\dot{q}_0=0$ lies on one oscillation mode. All oscillation modes pass through a common point $q_{min}$ at which the potential $U(q)$ is minimal. Accordingly, each of the desired oscillation modes is a strict mode. The point $q_{min}$ then becomes the rest position of the overall system with potential. The potential $U(q)$ is selected such that the resulting forces $$\tau = \frac{\partial U}{\partial q}$$

accelerate the system along the geodesics relative to the mass inertia tensor. Thus, all oscillation modes run along these system geodesics.

An integration of the System (1) for certain starting conditions yields geodesics of the system, which are obtained when the inertia tensor is selected as the metric of the configuration space. The rest position $q_{min}$ is always selected as the starting point. The system is shown simulated for many different initial speeds $\dot{q}_0$, for the configuration space in FIG. 2A and in the Cartesian space in FIG. 2B. The geodesics of the system depend exclusively on the direction of the initial speed $\dot{q}_0$, but not on the magnitude. The magnitude of $\dot{q}_0$ influences the speed with which the geodesics are traced, but not their course. An optional geodesic shall be denoted as $q=\bar{\gamma}(t)$. Moreover, $\gamma(\zeta)$ shall denote the parameterizing of $\bar{\gamma}(t)$ according to the path length, so that $$\left\| \frac{\partial \gamma}{\partial \zeta} \right\| = 1,$$

where $\zeta \in [0, 1]$ describes a scalar parameter and l describes the path length of the geodesic.

Figure 2A:
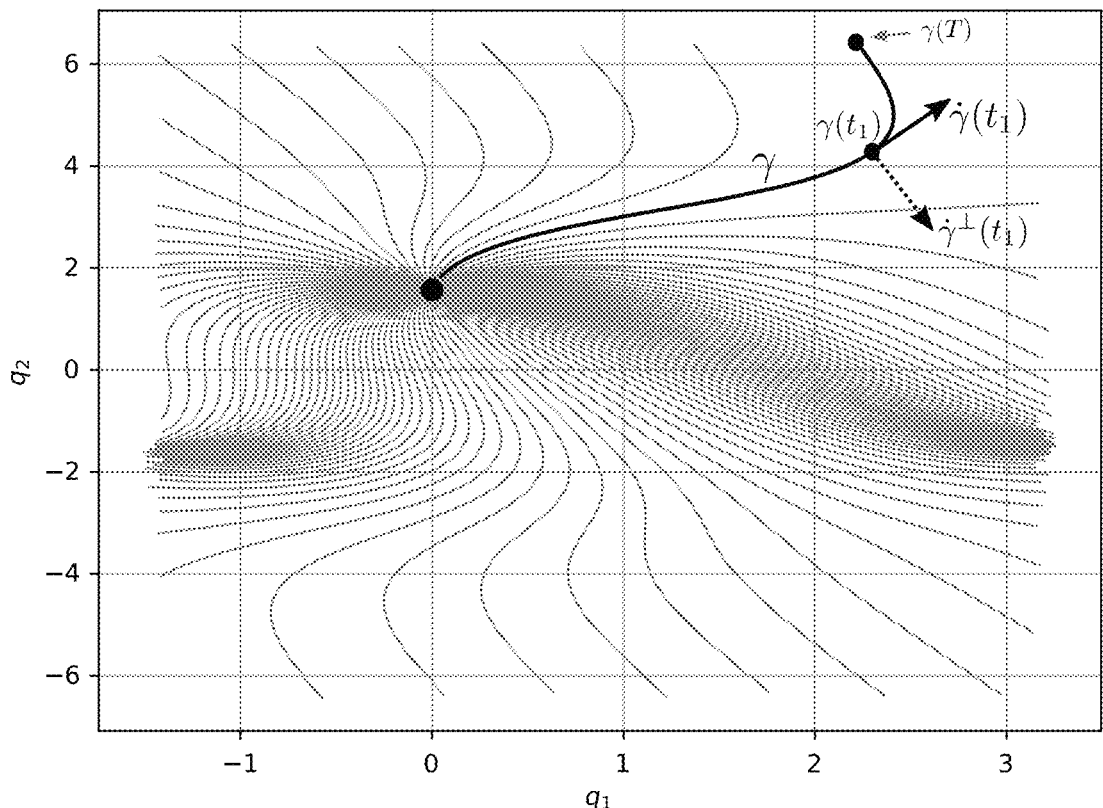
FIG. 2A shows basic trajectories of the system of FIG. 1 in the configuration space.
Figure 2B:
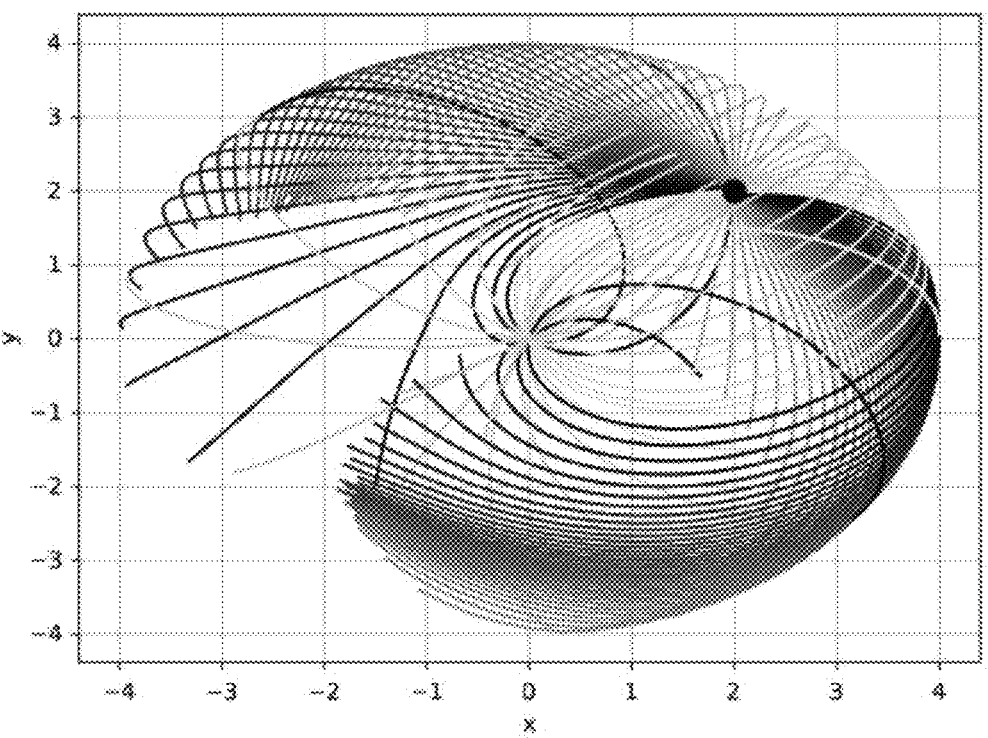
FIG. 2B shows basic trajectories of the system of FIG. 1 in the Cartesian space.

For a rest position at $$q_{min} = \left[ 0 \ \frac{\pi}{2} \right]^T,$$

as an example, the geodesics of the system as illustrated in FIG. 2A result in a joint angle space.

If the geodesics intersect in the joint angle space (configuration space), the area has to be restricted such that no more intersections exist. For the rest position at $q_{min}=[0 \ \pi]^T$, no intersection points of the geodesics occur.

For optional geodesics $\gamma(\zeta)$ of the potential-free system, the potential $U(q)$ has to satisfy the following property $$\forall \ \xi \in [0, \ l]: \ M^{-1}(\gamma) \frac{\partial U}{\partial q} \bigg|_{q=\gamma(\zeta)} = \alpha(\gamma)\dot{\gamma}, \qquad (3)$$

where $\partial U/\partial q$ is evaluated at the point $\gamma(\zeta)$, respectively. The weighting with the inverse mass matrix leads to the gradients $\partial U/\partial q$ of $U(q)$ can be used as generalized forces which accelerate the system along the geodesics. The scalar factor $\alpha(\gamma)$ describes an unknown scaling which is needed for the integrability of the vector field. The problem is formulated as an optimization problem and the property (3) is reformulated into the following property:

$$\frac{\partial U}{\partial q} M(\gamma)^{-1} \dot{\gamma}^{\perp} = 0. \qquad (4)$$

The vector $\dot{\gamma}^{\perp}$ denotes a unit vector which is orthogonal to $\dot{\gamma}$. By using the scalar product, the unknown factor $\alpha(\gamma)$ can be eliminated.

Now, the total quantity of N integrated geodesics is taken into consideration and each single one is discretized by selecting M points per geodesic. Let $\gamma_{ij}$ for $i \in \{1 \ldots N\}$ and $j \in \{1 \ldots M\}$ be the j-th point of the i-th geodesic and $\dot{\gamma}_{ij}$ be the tangent to the same point. Let the objective function $U(q)$ be written as a parametric function $U_{\hat{\omega}}(q)$. Subsequently, the condition (4) can be formulated as a cost function $$L(\omega) = \sum_{i=1}^{N} \sum_{j=1}^{M} \left( \frac{\partial U_{\omega}}{\partial q}(\gamma_{ij}) M(\gamma_{ij})^{-1} \dot{\gamma}_{ij}^{\perp} \right)^2$$

By minimizing the cost function $$\hat{\omega} = \arg \min_{\omega} L(\omega)$$

an optimum of the potential $U_{\hat{\omega}}(q)$ is obtained. An optional parametric representation of the potential can be used, which allows for an optimization of the cost function. For this embodiment, the potential function is represented as a neural network with tan h activation functions. The optimization is performed via a gradient descent according to the ADAM algorithm. The training data can be exchanged during optimization, in order to obtain a better generalization.

Figure 3:
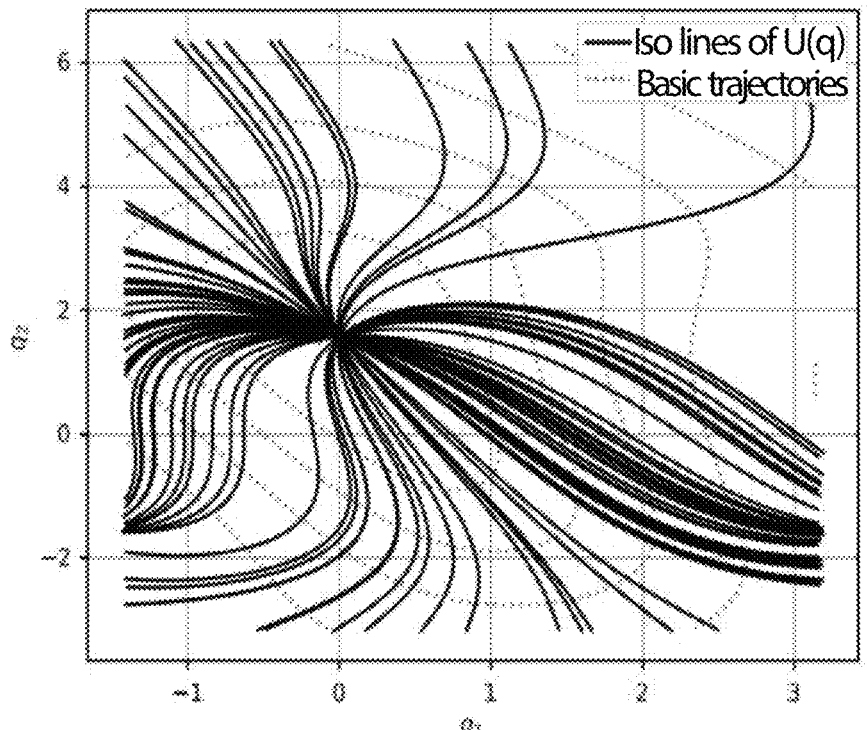
FIG. 3 shows eigenmodes of the system of FIG. 1 with isolines of the applied potential according to the present invention.

FIG. 3 shows an optimization result of the potential function, with some geodesics of the system being illustrated by solid lines and equipotential lines of the potential function being illustrated by broken lines. It should be noted that the potential applies only to the initially selected rest position $q_{min}$. For other rest positions, the optimization has to be performed again.

It is assumed in the following that the potential U(q) has been implemented on the mechanical system shown in FIG. 1. This can be implemented, for example, by designing (nonlinear) springs or, electrically, by means of capacitors and suitable motor control. The latter works efficiently in particular if the drive has a very high efficiency, e.g. with direct drives without gear ratio. In this case, the system dynamics of equation (2) are obtained.

Figure 4A:
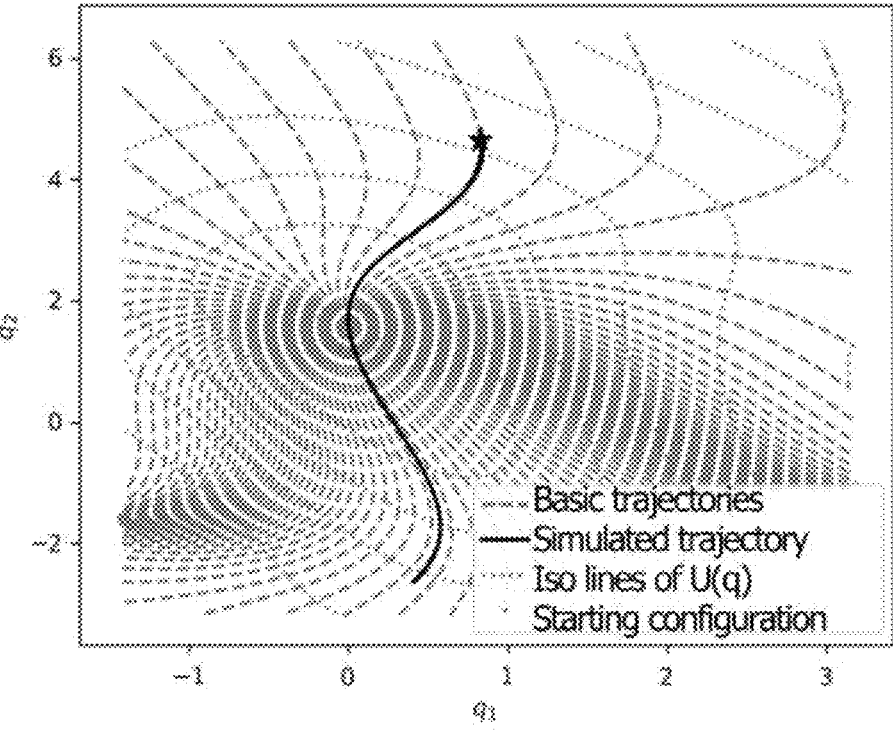
FIG. 4A shows a movement of the system in the configuration space.
Figure 4B:
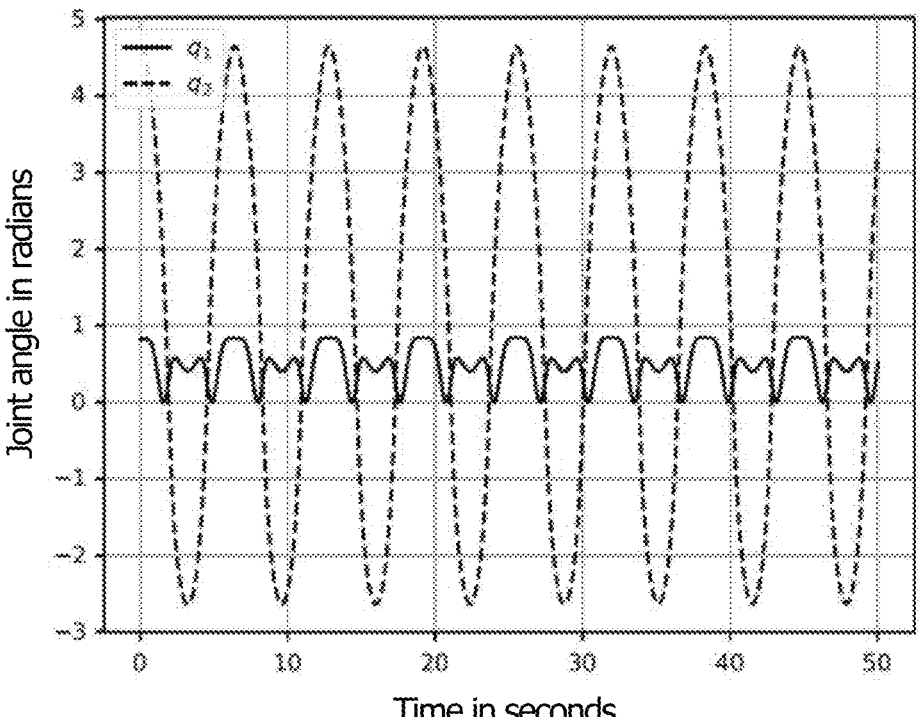
FIG. 4B illustrates the configuration variable of the movement of the system of FIG. 1, shown in FIG. 4A.

FIG. 4A shows a simulation result of the dynamics (2) including the potential. Due to the fact that the oscillation modes lie densely in the $q_1 q_2$ plane, optional starting points can be selected and the system will oscillate on one mode every time. FIG. 4A shows the simulated trajectory together with exemplary system geodesics. As illustrated in FIG. 4B, a plurality of periods of the oscillation is simulated. The system moves back and forth on the trajectory. FIG. 4B illustrates the temporal course of the joint angles.

Since the modes lie densely in the configuration space, the continuance on each of the modes is semi-stable. If the system deviates from a mode due to external influences or inaccuracies of the potential function, there is no mechanism to return the system to the original oscillation mode. Therefore, for an additional transversal stabilization on the mode, a controller can be added which keeps the system on a preset mode.

Transversal stabilization requires a measure which indicates the distance from the target mode. This corresponds to a function which allocates continuous coordinates to the geodesics. A function $\theta(q)$ is desired that is invariant on each of the geodesics and is continuous and monotonous between geodesics. In other words, the function $\theta(q)$ allocates a unique coordinate to each mode, so that a deviation from the mode results in a continuous change in $\theta(q)$. To determine the training data, system geodesics were simulated with different directions of the initial speed, starting from the rest position. Twice the angle of the direction of the initial speed is used as the coordinate $\theta$ of the geodesic. If the initial speed is interpreted as a complex number, the coordinate is given by $$\theta = 2\arg(\dot{q}_1 + \dot{q}_2 i) \qquad (5)$$

From using twice the angle, it results that the coordinate is locally point-symmetric at the rest position $q_{min}$. Thereby, $\theta$ is constant when passing through the rest position.

For control, the function $\theta(q)$ is required which, at each point q, determines the coordinate $\theta$ of the mode through the point q. It becomes clear that such a function cannot exist at the rest position $q_{min}$, since all modes converge there and thus all coordinates apply at the rest position. Moreover, it is required that the function is a strictly monotonously increasing function when moving counterclockwise around the rest position. A scalar function cannot represent this without singularities, since it is a parameterization of a 1-sphere, i.e. a circle. Instead of directly establishing the function $\theta(q)$, a two-dimensional function $$\Lambda(q) = \|q - q_{min}\|^2 \begin{bmatrix} \cos(\theta) \\ \sin(\theta) \end{bmatrix}$$

is used, the elements of which represent the cosine or the sine of the desired coordinate $\theta(q)$. Thereby, the 1-sphere is parameterized. The function $\Lambda(q)$ is also written as a parametric function (in this case a Radial Basis Function Network) and is approximated to the desired function by means of an optimization problem. To this end, the simulated geodesics are provided with the desired coordinate according to (5), and the function $\Lambda(q)$ is determined using a regression problem.

Figure 5:
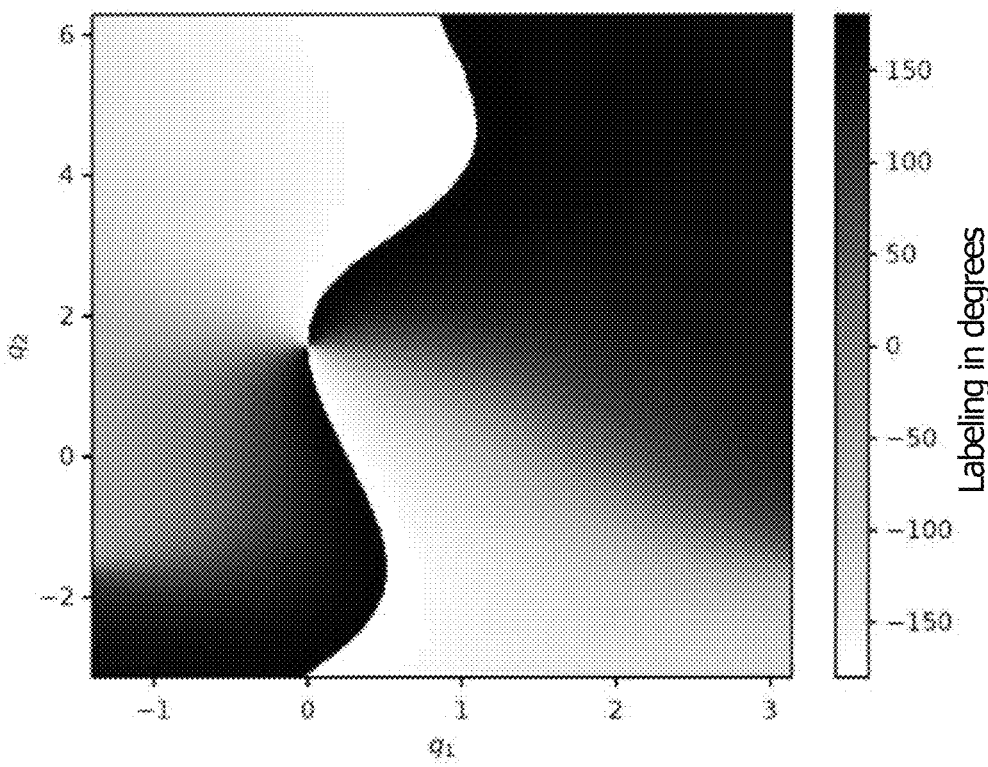
FIG. 5 illustrates the deviation function $\Delta\theta(q)$ of the controller in the system of FIG. 1.

FIG. 5 shows the results of the regression of the coordinate function for the exemplary rest position at $$q_{min} = \begin{bmatrix} 0 & \dfrac{\pi}{2} \end{bmatrix}^T.$$

From the two components of the function $\Lambda(q)=[\lambda_1 \ \lambda_2]^T$, a single scalar si determined by the formula $$\theta(q) = \arg(\lambda_1(q) + \lambda_2(q)i)$$

which is represented as a gray scalar in FIG. 5. The indication in the legend is in degrees, whereas the joint angles are indicated in radians.

Given the coordinate function $\theta(q)$, the transversal stabilization is achieved by means of a PD controller:

$$\tau_\theta = M(q)\frac{\partial U^\perp}{\partial q}\left[-k_{\theta P}\Delta\theta(q) - d_\theta(q)\dot{\theta}\right],$$

where $\Delta\theta$ is the deviation from the desired mode, $\dot{\theta}$ is the rate of change of the deviation of the desired mode, and $\partial U^\perp/\partial q$ is a unit vector orthogonal to $\partial U/\partial q$. Further, $k_{\theta P}$ denotes a constant and $d_\theta(q)$ determines the damping.

Finally, the quantities $\Delta\theta(q)$ and $\dot{\theta}(q)$ have to be determined using the two-dimensional function $\Lambda(q)$. Let the coordinate $\theta_d$ of the desired ode be given. In addition, let $$R_d = \begin{bmatrix} \cos\theta_d & -\sin\theta_d \\ \sin\theta_d & \cos\theta_d \end{bmatrix}$$

be a rotation matrix. To determine $\Lambda(q)$, first the function A(q) is evaluated and the matrix $$A(q) = \begin{bmatrix} \Lambda_1(q) & -\Lambda_2(q) \\ \Lambda_2(q) & \Lambda_1(q) \end{bmatrix}$$

is established. The matrix A(q) is not necessarily a rotation matrix. Using singular value decomposition, the orthogonalized matrix $Q(q)=UV^T$ with $U\Sigma V^T=A(q)$ is determined. Subsequently, let it be given that $$R_\Delta = R_d^\top Q = \begin{bmatrix} r_{\Delta,11} & r_{\Delta,12} \\ r_{\Delta,21} & r_{\Delta,22} \end{bmatrix}$$

and $$\Delta\theta(q) = a\tan2(r_{\Delta,21}, r_{\Delta,11}).$$

By calculating $\Delta\theta(q)$ based on the rotation matrices, the problem of the discontinuity of angular measures is avoided. For the change rate $\dot\theta$ of $\Delta\theta$, the following results:

$$\dot\theta = [-\sin\Delta\theta \ \cos\Delta\theta]\frac{\partial\Lambda}{\partial q}\dot q,$$

where $\partial\Lambda/\partial q$ denotes the Jacobi matrix of the function $\Lambda(q)$.

To determine the damping, the mass in $\theta$ coordinates is required. Let it be given that $$\frac{\partial\theta}{\partial q} = [-\sin\Delta\theta \ \cos\Delta\theta]\frac{\partial\Lambda}{\partial q}.$$

Then the mass is given by $$m_\theta(q) = \frac{1}{\dfrac{\partial\theta}{\partial q}M^{-1}(q)\dfrac{\partial^\top\theta}{\partial q}}$$

and the configuration-dependent damping is $$d_\theta(q) = 2\zeta\sqrt{k_{\theta P}m_\theta(q)},$$

where $\zeta \in [0 \ldots 1]$ denotes the degree of damping.

Since the coordinate function cannot work near the rest position, the controller $\tau_\theta$ is deactivated as soon as the distance $\|q - q_{min}\|$ falls below a predefined threshold value $\alpha$. Overall, $$\tau_c(q, \dot q) = \begin{cases} 0, & \text{is obtained, if } \|q - q_{min}\| \le \alpha, \\ \tau_\theta(q, \dot q), & \text{else} \end{cases}.$$

If both concepts
1. a potential $U(q)$ which fills the configuration space with shrinkage modes of the system, and
2. a controller $\tau_\theta$ to stabilize the system transversally on a selected mode or to move the system up to a desired mode,
are combined, the following system dynamics results:

$$\underbrace{M(q)\ddot q + C(q, \dot q)\dot q}_{\text{System dynamics}} + \underbrace{\frac{\partial U}{\partial q}}_{\text{passive potential}} + \underbrace{\tau_c(q, \dot q)}_{\text{active controller}} = 0. \tag{6}$$

The basic idea is to implement the potential $U(q)$ by means of energy storages. This can be implemented for example by correspondingly designed mechanical springs or electric energy storages. The system dynamics in combination with the potential already generates an oscillatory system and each starting point is on an oscillation mode. The active controller $\tau_\theta(q, \dot q)$ only compensates for inaccuracies of the potential, which can occur due to mechanical or electrical tolerances, as well as due to approximation errors during the optimization of the potential. Therefor, it can be expected that the torques caused by the controller $\tau_\theta(q, \dot q)$ are significantly smaller than those generated by the potential. Therefore, the lossy energy flow from or to the outside is very small and a high energy efficiency can be expected.

The controller $\tau_\theta(q, \dot q)$ further returns the system to a desired oscillation mode if it has been diverted therefrom before by external influences. Moreover, the controller enables a transition to other oscillation modes. In both cases, higher torques can be expected for a short time.

Figure 6A:
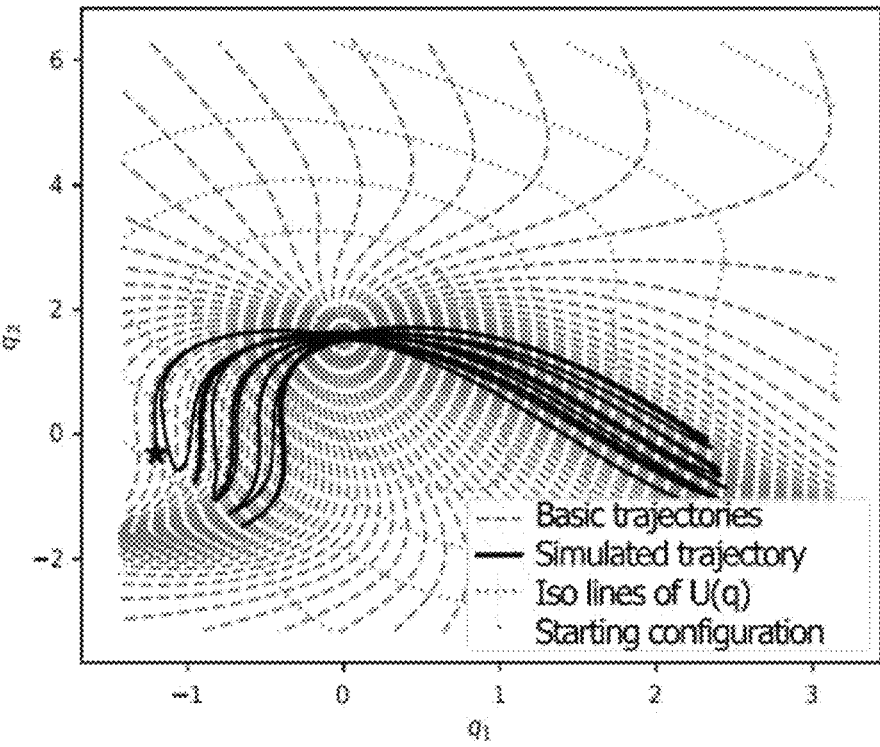
FIG. 6A illustrates the movement of the system of FIG. 1 in the configuration space along a plurality of modes.
Figure 6B:
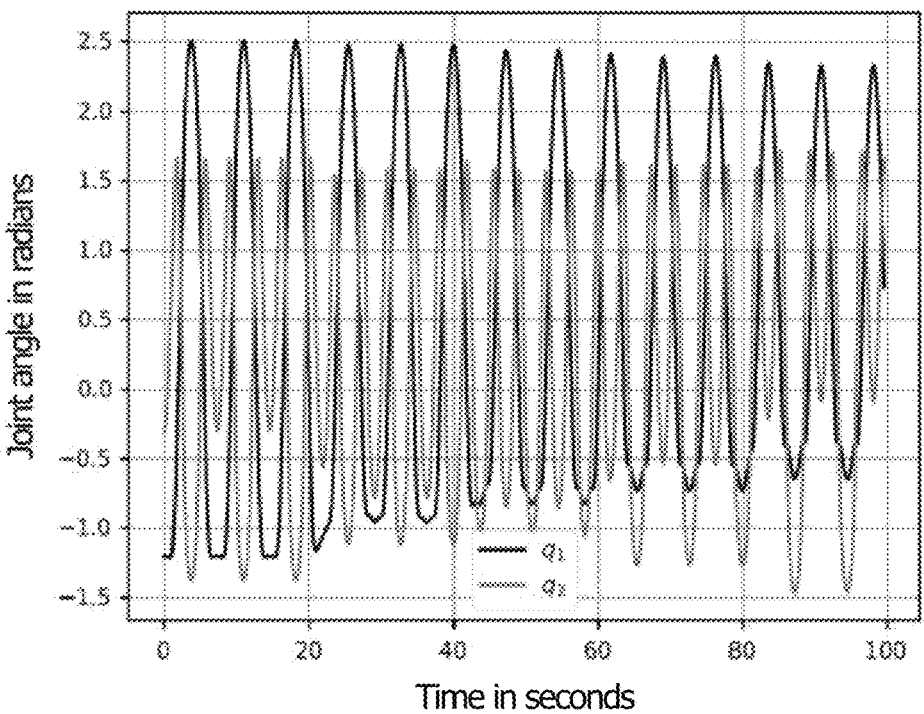
FIG. 6B shows the individual configuration variables of the system of FIG. 1 according to the movement in FIG. 6A.
Figure 7A:
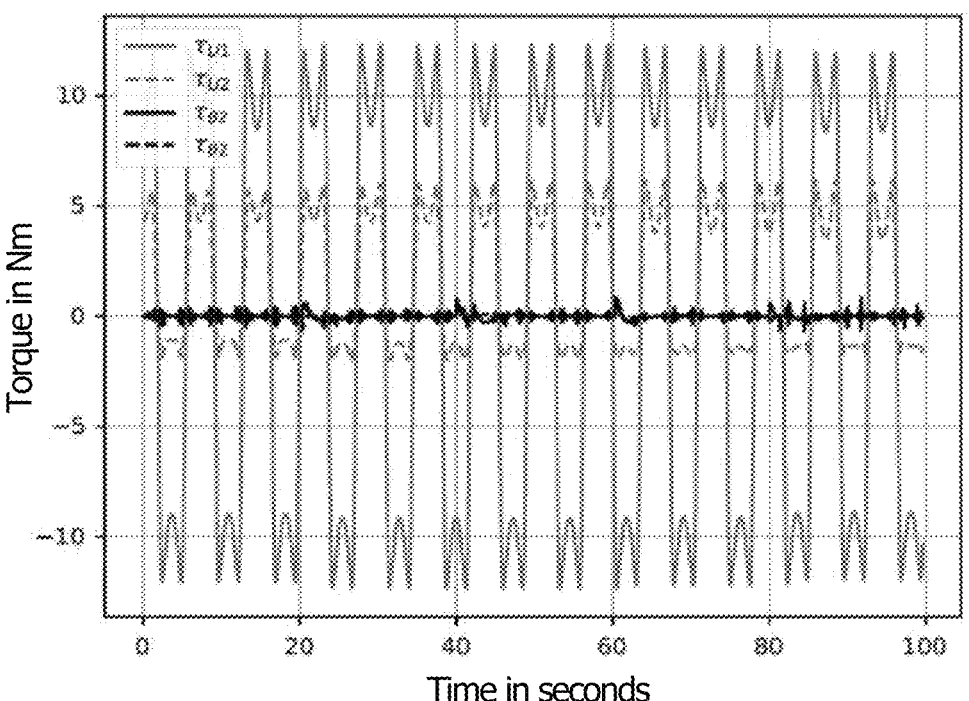
FIG. 7A shows the torques applied by the controller compared to the torques generated by the potential and FIG. 7B shows the deviation of the movement from the eigenmode of the system.
Figure 7B:
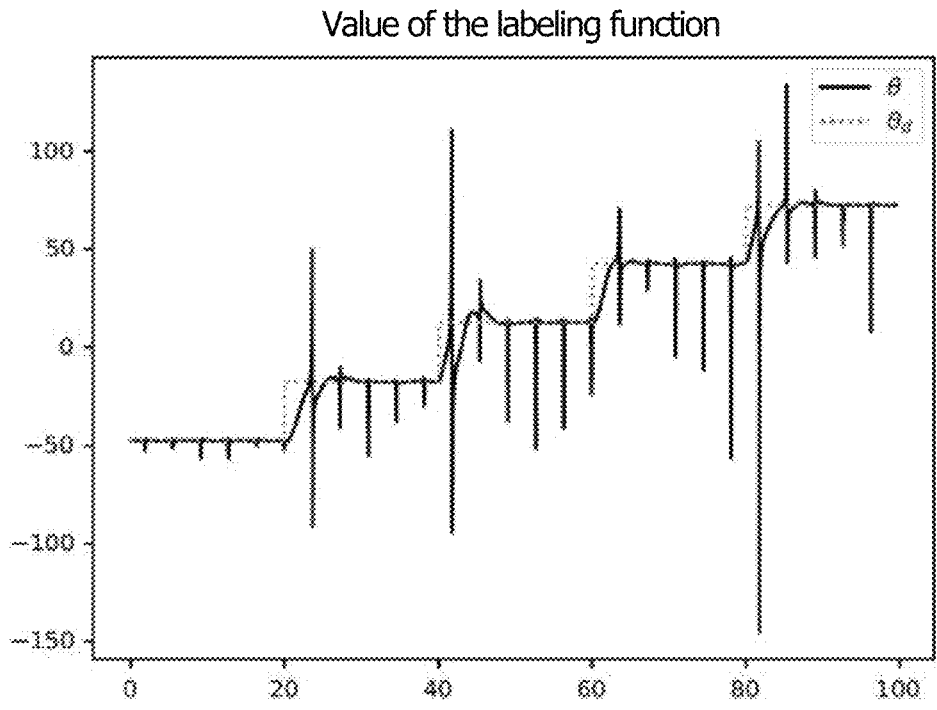

The resulting dynamics of the overall concept (6) is applied to the embodiment in FIG. 1 and simulated numerically. Starting from a starting point $q_0$, the differential equation is simulated. Initially, the mode on which the system is already located is selected as the desired mode $\theta_d$. In the course of the experiment, the desired mode $\theta_d$ is increased abruptly by $\pi/6$ every 20 seconds. FIG. 6A shows the simulated trajectory in the joint angle space, FIG. 6B shows the temporal course of the joint angles, FIG. 7A shows the course of the torques and FIG. 7B shows the coordinate function. in particular, FIG. 7A shows the comparison of the torques generated by the applied potential (shown in gray) and the torques applied by the controller (illustrated in black). The comparison shows that the torques generated by the controller are only small corrections and the movement is determined substantially by the potential. Further, it can be seen very well that the coordinate function does not work during the passage through the rest position. Since the controller is deactivated at those points, this is no problem for the system.

Thus, a system is provided which can be reliably moved on its eigenmodes and, in particular when the controller is implemented, does not leave these eigenmodes in the event of disturbances. Further, it is surprisingly shown that the eigenmodes of the system are densely located in the configuration space so that every point is on an eigenmode. Thus, a very versatile and efficient movement of the system can be performed. Applications for such a system can be found in robotic locomotion for walking and running. Using oscillatory modes, gaits and movement patterns can be simulated. Due to the characteristic that these are modes of the system, these are particularly energy-efficient. Further applications of the system according to the invention are pick-and-place tasks. The oscillation can be used for robotic pick-and-place tasks, in which objects are periodically picked up at a point A (e.g. an end of a conveyor belt) and placed at a point B or a plurality of points along a geodesic (e.g. packaging of objects or the like). In this case, too, a very energy-efficient application is given, since very little actuating energy is required.

The shape of the geodesics is determined by the kinematics, the inertia distribution thereof, as well as the choice of the rest position. If one or a plurality of these basic components are adapted, e.g. by changing the kinematics by shortening or lengthening components, by adapting the inertia distribution by additional masses or by selecting another rest position, the geodesics or the shape and position of the eigenmodes change. Thus, it is possible to adapt the eigenmodes to the respective application. If the concrete application specifies certain trajectories, the kinematic structure and their parameters, and/or the inertia properties of the mechanism and/or the rest position can be adapted in an additional optimization process preceding the potential optimization, such that the geodesics correspond as exactly as possible to the application.

The invention claimed is:

1. A dynamic nonlinear system with multiple degrees of freedom, the system comprising at least one potential element designed to generate eigenmodes of the system, wherein a potential is generated by means of the at least one potential element, wherein the potential causes an acceleration to act tangential to basic trajectories of the system, and wherein the basic trajectories are trajectories of the system without the potential.

2. The system according to claim 1, wherein at least one potential element is a mechanical, pneumatic, hydraulic or electrical energy storage.

3. The system according to claim 1, wherein the at least one potential element are springs or capacitors.

4. The system according to claim 1, wherein at least one potential element is one or a plurality of electric motors.

5. The system according to claim 1, wherein the at least one potential element are nonlinear potential elements.

6. The system according to claim 1, wherein a plurality of potential elements are provided.

7. The system according claim 1, wherein every point of a configuration space of the system lies on an eigenmode.

8. The system according to claim 1, wherein the potential has an energy minimum.

9. The system according claim 1, wherein a selected eigenmode $\theta_d$, which a movement follows, is selected only based on a direction of an initial speed.

10. The system according to claim 1, wherein the eigenmodes are basic trajectories corresponding to a mass tensor or a mass matrix of the system.

11. The system according to claim 1, wherein a derivation of the potential according to configuration variables is tangential to the basic trajectories with respect to a metric.

12. The system according to claim 1, wherein the potential U fulfills the condition:

$$\frac{\partial U}{\partial q} M(\gamma)^{-1} \dot{\gamma}^{\perp} = 0,$$

where q is the configuration variables of the system, M the mass inertia matrix, $\gamma$ is the movement along a basic trajectory parameterized by the path length, and $\dot{\gamma}^{\perp}$ is a vector perpendicular to the time derivative of $\gamma$.

13. The system according to claim 1, further comprising a controller, wherein the controller generates a restoring value $\tau_\theta$ which depends on a deviation $\Delta(\theta)$ of a movement q($\theta$) from a selected eigenmode $\theta_d$ of the movement and acts perpendicularly on the selected eigenmode $\theta_d$ of the movement.

14. The system according to claim 13, wherein the restoring value $\tau_\theta$ of the controller is given by:

$$\tau_\theta = M(q)\frac{\partial U^{\perp}}{\partial q}\left[-k_{\theta P}\Delta\theta(q) - d_\theta(q)\dot{\theta}\right],$$

where $\dot{\theta}$ is a deviation rate of a deviation from a desired mode, $\partial U^{\perp}/\partial q$ is a unit vector orthogonal to $\partial U/\partial q$, $k_{\theta_p}$ is a constant and $d_\theta(q)$ is a damping.

15. The system according to claim 13, wherein the controller is not active if:

$$\|q - q_{min}\| < \alpha,$$

where $q_{min}$ is an energy minimum of the potential and $\alpha$ is a predefined limit value.

16. The system according to claim 13, wherein the controller acts continuously on the movement of the system or acts on the movement at a reversal point of the movement or acts on the movement when the movement passes though an energy minimum of the potential.

17. A method for designing a dynamic nonlinear system with multiple degrees of freedom, the method comprising the steps of:

selecting a starting point of the system;

determining a potential of the system, the potential generating an acceleration tangential to basic trajectories of the system, the basic trajectories representing trajectories of the system without the potential; and implementing the potential by means of potential elements;

wherein eigenmodes of the system are adapted to a predefined movement by adapting kinematics or inertia properties or components of the system.

18. A system with multiple degrees of freedom, wherein the system is designed according to the method according to claim 17.

* * * * *